June 5, 1934.  L. M. McCORMICK  1,961,235
CONNECTER FOR ELECTRIC CONDUCTORS
Filed June 20, 1927
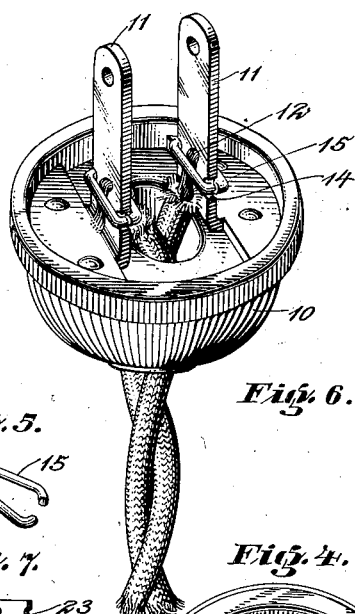
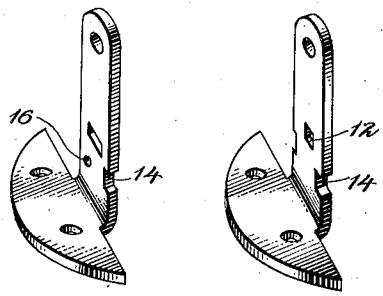
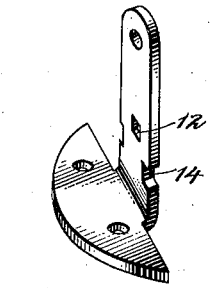
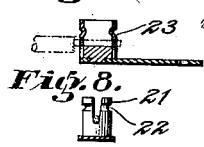
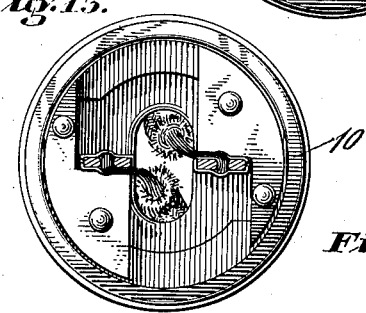
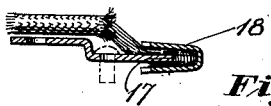
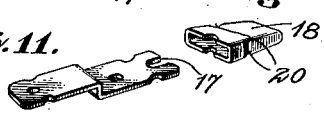
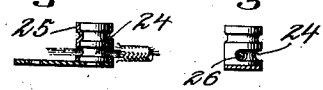
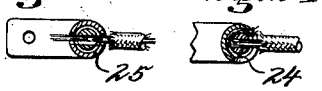
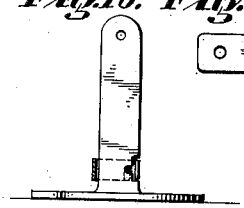
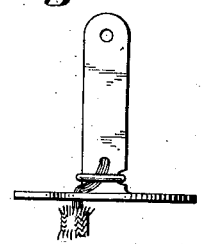
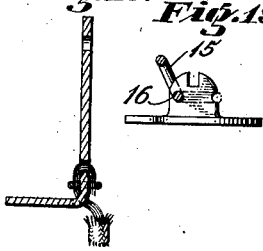
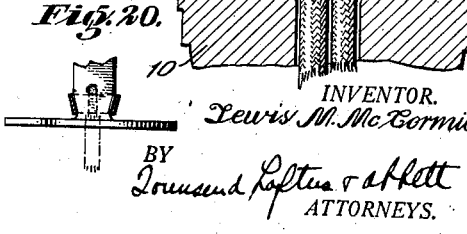
INVENTOR.
Lewis M. McCormick
BY
Townsend Loftus & Abbott
ATTORNEYS.

Patented June 5, 1934

1,961,235

UNITED STATES PATENT OFFICE 1,961,235

CONNECTER FOR ELECTRIC CONDUCTORS

Lewis Montford McCormick, Palo Alto, Calif.

Application June 20, 1927, Serial No. 200,054

18 Claims. (Cl. 173—361)

This invention relates to electrical apparatus, and particularly pertains to improved means for connecting electrical conductors to the terminals of switches and analogous devices. Hitherto it has been common practice to connect conductors to the terminals of attachment plugs, switches, and similar electrical devices by winding the end of the conductors about the shanks of connecting screws, and then clamping them between the screw head and the terminal. This method has not proven entirely satisfactory, mainly because the constant pressure against the wire aids in causing the wire to become disconnected from the terminal. Also the ends of the wires frequently protrude from the terminals, short-circuiting the device. Therefore, it is the principal object of the present invention to provide a generally improved connecting medium for securely attaching conductors to the terminals of attachment plugs and analogous structures, which medium is simple and inexpensive and effective to prevent the wires from short-circuiting the device.

The present invention contemplates the provision of terminals formed with means over which the conductors may be bent, and clamping members preferably but not necessarily, of resilient metal which may be clamped over the terminals to tightly press the ends of the conductors thereagainst. It is preferred that the metallic members referred to be adapted to engage with means integrally formed on the terminals to secure them in place.

The invention is shown by way of example in the accompanying drawing, in which:

Fig. 1 is a perspective view of an attachment plug cap disclosing the manner in which I may connect the conductors to the terminals or blades.

Figs. 2 and 3 show two forms of attachment plug blades which may be used in connection with the present invention.

Fig. 4 is an end view of an attachment plug cap disclosing the manner in which the conductors are connected to the blades when the latter are disposed at right angles to each other.

Figs. 5 and 6 are perspective views of two forms of clamping members which may be employed.

Fig. 7 is a view in central section through another form of terminal embodying the present invention, disclosing a clamping sleeve arranged thereon.

Fig. 8 is a view taken at right angles to Fig. 7 with the clamping sleeve removed.

Fig. 9 is a view similar to Fig. 8 with the clamping sleeve in place.

Fig. 10 is a central section through another type of terminal, disclosing another form which the present invention may assume.

Figs. 11 and 12 are perspective views of the two parts of the device disclosed in Fig. 10.

Fig. 13 is an end view of an attachment plug cap, showing the conductors connected to the blades thereof with the blades in parallelism.

Figs. 14 and 15 are views in elevation and central section respectively of attachment plug blades, showing the manner in which the wires may be connected thereto.

Fig. 16 is a view in elevation of an attachment plug blade showing another manner in which the wire may be connected and clamped in place on the terminal.

Figs. 17 and 18 are perspective views of clamping members used in connection with the present invention.

Fig. 19 is a view in elevation of a terminal, showing another embodiment of the invention.

Fig. 20 is a view in elevation of an attachment plug blade showing another embodiment of the invention.

Fig. 21 is a view in elevation of another form which the invention may assume, with parts in section to more clearly disclose its construction.

Fig. 22 is a view in elevation of the terminal disclosed in Fig. 21.

Figs. 23 and 24 are transverse sectional views through the device disclosed in Fig. 21, showing the clamping sleeve in two different positions.

Fig. 25 is a fragmentary view in vertical section through an attachment plug cap, disclosing the wires connected to the blades in two different manners.

Referring more particularly to the accompanying drawing, 10 indicates an attachment plug cap having the usual blades 11. These blades are secured at their lower ends through the end of the cap 10 in any suitable manner. The blades 11 are arranged in parallelism, and project axially from the cap at a spaced distance apart. The type of blades shown in Fig. 1 is illustrated in detail in Fig. 3. Reference being had to this figure, it will be seen that the blade is formed intermediate its ends with an opening 12 and notches 14, which may be disposed at opposite sides of the blade just below the opening 12. To attach the electrical conductors to the blades they are led upwardly to the plug, as disclosed in Fig. 1, and the stripped ends thereof are led outwardly through the openings 12 in the opposed blades. The conductors are then bent downwardly against the sides of the blades. After being thus positioned, clamping rings 15, formed of metal, are arranged on the blades 11 to embrace them. The dimensions of these rings 15 are such that they may be contracted into the notches 14 at opposite sides of the switch blades 11. When contracted into these notches the rings 15 will tightly press the wire of the conductors against the opposite sides of the blades 11, thus forming a good contact and preventing the conductors from becoming disconnected from the blades. By this arrangement the clamping member engages the opposite edge portions of the terminal, the intermediate portion clamping the conductor to the terminal.

In Fig. 2 I have shown a blade having but one notch 14. In using this type of blade an opening 16 is drilled or punched through the blade opposite the notch 14, and the ring 15 is threaded through this hole 16. In this manner the rings may be fitted to the blades prior to connecting the conductors. As the rings 15 are split the legs thereof may be spread or pivotally actuated and the ends of the conductors positioned, after which the rings may be arranged to clamp the wires to the blades, as illustrated in Fig. 1. The rings 15 just described, are formed of wire, and I may prefer to use a flat material, as illustrated in Fig. 6 or formed as shown in Figs. 4 and 13.

In Figs. 10 to 12 inclusive the end of the terminal is notched as at 17, and the wire is bent over the end of the terminal in engagement with this notch. A cap 18 of sheet metal or any suitable material is adapted to be arranged over the notched end of the terminal to lock the wire in place in engagement with the notch 17 and to clamp the wire in intimate contact with the opposite sides of the terminal, as illustrated in Fig. 10. At its opposite sides the terminal is notched so that it will be engaged by protrusions 20 in the cap to latch the latter in place.

In Figs. 7 to 9 inclusive I have disclosed a different type of terminal. Reference being had to these figures, it will be seen that the terminal is cylindrical, but not necessarily so, and formed with a V-shaped notch 21 extending inwardly from its end. A groove 22 is formed about the notched end of the terminal. To clamp a wire in this type of terminal a sleeve 23 is fitted over the terminal and is formed with a slotted opening extending inwardly from one end so that a wire may be inserted through it and through the notch 21. The upper end of this sleeve has protrusions to engage the groove 22 so that the sleeve will not become disconnected from the terminal. After the wire has been led through the notch 21 the sleeve is placed over the terminal, and it is of such dimensions as to cause the terminal to contract when adjusting the sleeve in place on the conductor.

In Figs. 21 to 24 inclusive I have shown a type of terminal similar to that shown in Figs. 7 to 9 inclusive. In this type of terminal the wire is led about a groove 24 formed contiguous to the lower end of the terminal. The sleeve 25 fitting over the terminal is formed with an opening extending one-half of its circumference. A hole 26 is drilled through the terminal in alignment with the notch 24 and the opening in the sleeve. The wire is led through this opening and then bent downwardly around the groove 24. The sleeve 25 is then revolved one-half a revolution to clamp the wire in this position. It will be noticed by reference to Fig. 21 that the upper end of the sleeve 25 is crimped into an annular groove contiguous to the upper end of the terminal so that the sleeve will be maintained in place on the terminal.

In Fig. 16 the side of the switch blade is notched to receive both the wire and the clamping band. I may prefer in the same type of connecter to form a bayonet slot in the side of the blade, as indicated in dotted lines in Fig. 16. This construction would securely lock the wire in place on the blade.

In Fig. 19 a structure similar to that shown in Fig. 2 is illustrated, with the exception that the end of the terminal is notched so that the wire may be laid therein, as described in connection with Figs. 10 to 12. In this Fig. 19, however, the clamping ring 15 is attached to the terminal and may be pivotally arranged to embrace the terminal and clamp the conductor thereto.

In Fig. 20 the lower end of the blade 11 is tapered inwardly. Just above this tapered portion the blade is formed with a punched or drilled opening, so that the wire or conductor may be led therethrough and the same bent against the opposite sides of the blade. The clamping band is arranged over the blade and forced downwardly to the tapered portion. In engaging the wires the clamping band is contracted and drawn tightly upon the tapered portion of the blade. The clamping devices used in connection with the structure shown in Figs. 19 and 20 are illustrated in Figs. 5, 17 and 18.

From the foregoing it is obvious that I have provided an inexpensive medium for connecting electrical conductors to the terminals of switches and analogous devices. This connecting medium is susceptible to many modifications all embodying but one invention. These modifications have been disclosed in the present instance to illustrate the simplicity with which conductors may be connected to the terminals of various electrical structures.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:—

1. A device of the character described comprising a terminal having an opening formed therein to receive the wire of an electric conductor, and a clamping member embracing the terminal and pivotally mounted and adapted to be swung about its pivot to engage and clamp the wire to the terminal.

2. A device of the character described comprising a terminal having an opening formed therein to receive the wire of an electric conductor, a clamping member embracing the terminal and pivotally mounted and adapted to be swung about its pivot to engage and clamp the wire to the terminal, and means for securing the free end of the clamp when in clamping position.

3. In a device of the character described, an electric terminal constructed of flat metal, said terminal having an opening formed therein to receive the wire of an electric conductor, a clamping member pivotally attached to one side of the terminal and adapted to be swung to embrace the terminal and to engage and clamp the wire, said terminal having a catch formed in the side opposite the pivotal end to receive and secure the free end of the clamping member.

4. In a device of the character described comprising an elongated terminal having an opening formed therein at right angles to its longitudinal axis, said opening adapted to receive an electric conductor, and a clamping member pivotally secured at one end to the terminal and adapted during movement about its pivot to engage the conductor and bend it to lie parallel to the longitudinal axis of the terminal and also adapted to clamp and secure the conductor, said clamp when in clamping position lying at right angles to the longitudinal axis of the terminal.

5. A device of the character described comprising a one piece terminal formed to receive the wire of an electric conductor, a resilient clamping member adapted to move along the terminal in a single action motion engaging and securing the wire to the terminal, and means formed integral with the terminal to secure the clamping member against release when in clamping position.

6. A device of the character described, a terminal adapted to receive the wire of an electric conductor and means pivotally mounted and adapted to engage, clamp and secure the wire, said means when in clamping position lying at an angle to the longitudinal axis of the terminal.

7. A device of the character described comprising a terminal adapted to receive the wire of an electric conductor and a clamping member embracing the terminal and pivotally mounted and adapted to be swung about its pivot to engage, clamp and secure the wire to the terminal.

8. In a device of the character described, a relatively flat terminal formed with means engageable with a bend of a conductor, an exteriorly arranged elongated clamping member extending across the terminal and engaging the opposite edge portions thereof, the intermediate portion clamping the conductor in engagement with the terminal between the said edge portions, said terminal having means integrally formed thereon to prevent the displacement of said member in at least two directions.

9. In a device of the character described, a relatively flat terminal formed with means engageable with a bend of a conductor, an exteriorly arranged elongated clamping member extending across the terminal and engaging the opposite side edges thereof, the intermediate portion clamping the conductor in engagement with the terminal between the said edges, said terminal having means integrally formed thereon to prevent the displacement of said member in a direction opposite to the base of said terminal.

10. In a device of the character described, a relatively flat terminal formed to receive an electrical conductor, a member adapted to clamp said conductor to the terminal, said terminal having means integrally formed thereon to cooperate with said member to prevent the displacement of the same in at least two directions.

11. In a device of the character described, a relatively flat terminal formed to receive an electrical conductor, and means adapted to clamp a portion of the conductor against a side of the terminal, said means comprising a member having a medial portion overlying a portion of said conductor and end portions engaging the terminal at two edges thereof, said terminal having means formed thereon to cooperate with said member to prevent the displacement of the member.

12. In a device of the character described, a relatively flat terminal formed to receive an electrical conductor, an elongated member adapted to clamp a portion of the conductor against a side of said terminal, said member having an end portion engaging the terminal and a medial portion overlying a portion of said conductor, said terminal having means integrally formed thereon to cooperate with an end portion of the member to prevent the displacement of the member in at least two directions.

13. In a device of the character described, comprising a relatively flat terminal formed to receive an electrical conductor, and means for clamping said conductor in at least two points, against opposite sides of the terminal, said means comprising a U-shaped member adapted to embrace the terminal.

14. In a device of the character described, comprising a relatively flat terminal formed to receive an electrical conductor and means for clamping the conductor in at least two points, against opposite sides of said terminal, said means comprising a U-shaped member adapted to embrace the terminal, said terminal having a means integrally formed thereon to prevent displacement of said clamping means.

15. In a device of the character described, comprising a relatively flat terminal formed to receive an electrical conductor and means for clamping the conductor in at least two points, against opposite sides of said terminal, said means comprising a U-shaped member adapted to embrace the terminal, said member having an end portion adapted to engage with an edge portion of the terminal to prevent displacement of the member.

16. In a device of the character described, comprising a terminal formed to receive an electrical conductor, a member pivotally mounted and adapted to clamp said wire to the terminal, said member having means integrally formed on a free portion thereof adapted to cooperate with the terminal to prevent displacement of the member.

17. In a device of the character described, comprising a relatively flat terminal formed to receive an electrical conductor, and means for clamping a portion of the conductor against a side of the terminal, said means comprising a member having a pivotal connection to the terminal.

18. In a device of the character described, a relatively flat terminal formed to receive an electrical conductor, and means for clamping a portion of the conductor to a side of the terminal, said means comprising an elongated member having a medial portion overlying and extending at an angle to said conductor portion, one end portion of said member being locked to the terminal.

LEWIS MONTFORD McCORMICK.